(12) United States Patent
Nishi

(10) Patent No.: US 11,653,716 B2
(45) Date of Patent: May 23, 2023

(54) ANTI-SLIP MEMBER FOR WEARABLE EQUIPMENT OR SPORTS EQUIPMENT, WEARABLE EQUIPMENT, AND SPORTS EQUIPMENT

(71) Applicant: ASICS CORPORATION, Hyogo (JP)

(72) Inventor: Toshiaki Nishi, Hyogo (JP)

(73) Assignee: ASICS CORPORATION, Hyogo (JP)

( * ) Notice: Subject to any disclaimer, the term of this patent is extended or adjusted under 35 U.S.C. 154(b) by 0 days.

(21) Appl. No.: 17/435,152

(22) PCT Filed: Mar. 5, 2019

(86) PCT No.: PCT/JP2019/008674
§ 371 (c)(1),
(2) Date: Aug. 31, 2021

(87) PCT Pub. No.: WO2020/178987
PCT Pub. Date: Sep. 10, 2020

(65) Prior Publication Data
US 2022/0132988 A1 May 5, 2022

(51) Int. Cl.
*A43B 13/22* (2006.01)
*A63B 60/08* (2015.01)
*A63B 53/14* (2015.01)

(52) U.S. Cl.
CPC .............. *A43B 13/22* (2013.01); *A63B 53/14* (2013.01); *A63B 60/08* (2015.10)

(58) Field of Classification Search
CPC . A41B 11/126; A41B 11/128; A41B 2400/80; A43B 13/22
See application file for complete search history.

(56) References Cited

U.S. PATENT DOCUMENTS

| | | | |
|---|---|---|---|
| 4,779,360 A * | 10/1988 | Bible | A43B 3/16 36/7.7 |
| 4,810,559 A * | 3/1989 | Fortier | A41D 31/24 2/2.5 |
| 6,049,915 A * | 4/2000 | Malowaniec | A61F 13/4902 2/400 |
| 6,610,382 B1 * | 8/2003 | Kobe | A63B 60/06 428/104 |
| 8,032,199 B2 * | 10/2011 | Linti | A61B 5/02055 600/389 |

(Continued)

FOREIGN PATENT DOCUMENTS

| CN | 205569712 U | 9/2016 |
|---|---|---|
| JP | H06253905 A | 9/1994 |

(Continued)

OTHER PUBLICATIONS

Chinese Office Action dated Oct. 29, 2021 in corresponding Chinese Application No. 201980087603.0 (with English Translation).

(Continued)

*Primary Examiner* — Bao-Thieu L Nguyen
(74) *Attorney, Agent, or Firm* — Global IP Counselors, LLP

(57) ABSTRACT

An anti-slip member for a wearable equipment or sports equipment, the anti-slip member includes an elastic body including an elastomer and a hydrogel, and at least part of the hydrogel dispersed on a surface of the elastic body.

13 Claims, 8 Drawing Sheets

(56) References Cited

U.S. PATENT DOCUMENTS

| | | |
|---|---|---|
| 10,905,116 B2* | 2/2021 | Kim .......................... B32B 5/02 |
| 2002/0114920 A1 | 8/2002 | Scholz et al. |
| 2005/0145150 A1* | 7/2005 | Mortell ............. A61F 13/15747 |
| | | 112/475.09 |
| 2006/0218697 A1* | 10/2006 | Modha ................... A61B 42/00 |
| | | 2/161.7 |
| 2007/0047752 A1 | 3/2007 | Wagner et al. |
| 2007/0088341 A1* | 4/2007 | Skiba ................... A43B 1/0045 |
| | | 606/2 |
| 2007/0088392 A1* | 4/2007 | Skiba ................... A47G 9/0253 |
| | | 5/737 |
| 2007/0239212 A1* | 10/2007 | Schneider ............ A41B 11/005 |
| | | 607/2 |
| 2008/0091097 A1* | 4/2008 | Linti ...................... A61B 5/282 |
| | | 600/389 |
| 2009/0234259 A1* | 9/2009 | Hardman ............. A61B 5/0002 |
| | | 601/134 |
| 2012/0136087 A1 | 5/2012 | Parakka et al. |
| 2013/0152268 A1* | 6/2013 | Langdon ................ A41B 13/00 |
| | | 2/80 |
| 2016/0058107 A1 | 3/2016 | Walker et al. |
| 2017/0182386 A1 | 6/2017 | Inoue et al. |
| 2017/0191190 A1* | 7/2017 | Nakatsuka ................ D01F 8/14 |
| 2017/0238653 A1* | 8/2017 | Baghdadi ........... A43B 23/0215 |
| 2017/0251751 A1* | 9/2017 | Baghdadi ............. A43B 13/122 |
| 2017/0318901 A1 | 11/2017 | Nishi |
| 2018/0103719 A1* | 4/2018 | Chen .................. B29D 35/0009 |
| 2019/0110471 A1* | 4/2019 | Kim ..................... A41D 31/305 |
| 2019/0380431 A1 | 12/2019 | Sakamoto et al. |
| 2021/0145122 A1* | 5/2021 | Fromholtz ............. A43B 17/00 |
| 2022/0040506 A1* | 2/2022 | Ansari ................. A62B 18/025 |
| 2022/0071353 A1* | 3/2022 | Fromholtz ........... A43B 13/181 |

FOREIGN PATENT DOCUMENTS

| | | |
|---|---|---|
| JP | 2005-087408 A | 4/2005 |
| JP | 2006-6571 A | 1/2006 |
| JP | 2012-530052 A | 11/2012 |
| JP | 2016076432 A1 | 5/2016 |
| JP | 2017-113388 A | 6/2017 |
| JP | 2018-126694 A | 8/2018 |
| JP | 2018193555 A1 | 10/2018 |

OTHER PUBLICATIONS

Australian Office Action dated Nov. 17, 2021 in corresponding Australian Application No. 2019432574.
International Search Report dated May 28, 2019 in corresponding International Patent Application No. PCT/JP2019/008674, filed Mar. 5, 2019 (with English Translation).
Extended European Search Report dated Jan. 27, 2021 in corresponding European Application No. 19917543.1.
European Office Action dated Oct. 19, 2021 in corresponding European Application No. 19917543.1.

* cited by examiner

ANTI-SLIP MEMBER FOR WEARABLE EQUIPMENT OR SPORTS EQUIPMENT, WEARABLE EQUIPMENT, AND SPORTS EQUIPMENT

CROSS-REFERENCE TO RELATED APPLICATIONS

This application is a U.S. National Stage application of International Application No. PCT/JP2019/008674, filed Mar. 5, 2019, the contents of which are hereby incorporated herein by reference.

BACKGROUND

Field of the Invention

The present invention relates to an anti-slip member for wearable equipment or sports equipment, wearable equipment, and sports equipment, and more specifically, to an anti-slip member for wearable equipment or sports equipment, which has improved wet-grip performance, and wearable equipment and sports equipment including the anti-slip member.

Background Information

Players wear various wearable equipment or use various sports equipment for playing sports. There are some conventional wearable equipment or sports equipment which are supposed to make contact with an object wet by water, such as wet ground, a wet ball or a player's hand. When the equipment makes contact with the wet object, water interposed between the equipment and the object blocks direct contact between the equipment and the object and hence is likely to cause slippage therebetween.

Sports shoes can be an example of the wearable equipment are sometimes used on ground wet by water during or after rain. The wet ground is likely to cause slippage and may pose a risk of the wearer of the sports shoes slipping an falling on the ground when the wearer moves relative to the ground.

Further, in sports equipment, such as a bat, which is gripped by a player when in use, sweat from the player may occur or intrude between the grip of the sports equipment and the player's hand. The sweat present between the grip and the hand may cause slippage therebetween, which makes it hard for the player's hand to securely grip the bat. In some cases, sweat causes the bat to slip out of the player's hands.

There are conventionally known shoe soles disclosed in, for example, JP 2005-087408 A, WO 2018/193555, and WO 2016/076432, which disclose an anti-slip member that has improved wet-grip performance and is intended to be used for the wearable equipment or sports equipment. JP 2005-087408 A discloses a rubber and/or resin foam for a shoe sole incorporated with chips or pieces produced by polishing or cutting leather. This foam for the shoe sole has improved wettability with water and thereby has high wet-grip performance by the incorporated chips or pieces produced by polishing or cutting leather having high water absorbability. WO 2018/193555 discloses an outer sole formed of a viscoelastic material including rubber. This outer sole has increased wet-grip performance by adjusting the loss factor and the storage elastic modulus in dynamic viscoelasticity measurement of the viscoelastic material, and adjusting the tensile stress of the viscoelastic material to thereby enable the viscoelastic material to have increased viscosity. WO 2016/076432 discloses an outer sole formed of a composition including a thermoplastic elastomer. This outer sole has an increased wet-grip performance by increasing the surface free energy of the composition and thereby suppressing formation of a liquid film between the surface of the composition and a road surface.

SUMMARY

While various anti-slip members as mentioned above have been proposed, there are ongoing demands for an anti-slip member that is widely applicable to various wearable equipment or sports equipment and has more improved wet-grip performance, and wearable equipment and sports equipment that have more improved wet-grip performance.

Therefore, it has been determined that there is a demand for an anti-slip member that can exhibit sufficient grip performance, that is, a high wet-grip performance by being incorporated with the wearable equipment or sports equipment which can make contact with the wet object, thereby suppressing slippage between itself and the wet object.

In view of the aforementioned problems, it is an object of embodiments of the present invention to provide an anti-slip member for wearable equipment or sports equipment having improved wet-grip performance, and wearable equipment and sports equipment including the anti-slip member.

It has been found that the aforementioned problems can be solved by dispersing a hydrogel on the surface of an elastomer. Hydrogel is a material that is also used as a biomaterial such as an artificial cartilage, and is widely known as a material that easily slips on an object that has been wet by water because it has high hydrophilic properties. The present inventors have surprisingly and unexpectedly found that dispersion of hydrogel having such characteristics on the surface of the elastomer significantly improves the wet-grip performance of the anti-slip material including the elastomer and the hydrogel compared to the prior arts, and hence accomplished the embodiments of present invention disclosed herein.

That is, according to embodiments of the present invention, an anti-slip member for wearable equipment or sports equipment is provided, the anti-slip member comprising an elastic body including an elastomer and a hydrogel, and at least part of the hydrogel being dispersed on a surface of the elastic body.

The anti-slip member for the wearable equipment or sports equipment according to embodiments of the present invention is preferably configured such that a ratio of the area occupied by the hydrogel is 1 to 25% of the entire area of the surface of the elastic body.

In the anti-slip member for the wearable equipment or sports equipment according to embodiments of the present invention, the hydrogel is preferably a crosslinked body.

In the anti-slip member for the wearable equipment or sports equipment according to embodiments of the present invention, the hydrogel preferably includes a polyvinyl alcohol gel. More preferably, the polyvinyl alcohol gel has a saponification degree of 80 to 100%.

In the anti-slip member for the wearable equipment or sports equipment according to embodiments of the present invention, the hydrogel preferably includes a silicone hydrogel.

The anti-slip member for the wearable equipment or sports equipment according to embodiments of the present invention preferably further includes a silane coupling agent.

In the anti-slip member for the wearable equipment or sports equipment according to embodiments of the present invention, it is preferable that the hydrogel also be dispersed inside the elastic body, and the anti-slip member include the hydrogel in an amount of 1 to 10% by weight based on the elastomer.

Wearable equipment or sports equipment according to embodiments of the present invention include the aforementioned anti-slip member.

It is preferable that the wearable equipment according to embodiments of the present invention be a shoe, and the anti-slip member be provided at a ground engaging position of a shoe sole of the shoe. It is more preferable that the anti-slip member be provided at least one of positions respectively corresponding to a heel, metatarsophalangeal joints, and a toe.

BRIEF DESCRIPTION OF DRAWINGS

The invention will be explained in more detail hereinafter with reference to the drawings.

DETAILED DESCRIPTION

Hereinafter, an embodiment of an anti-slip member for wearable equipment or sports equipment, and an embodiment of sports equipment, of the present will be described with reference to the drawings. The following embodiments are shown merely as examples. The present invention is not limited to the following embodiment at all.

Anti-Slip Member

Figure 1:
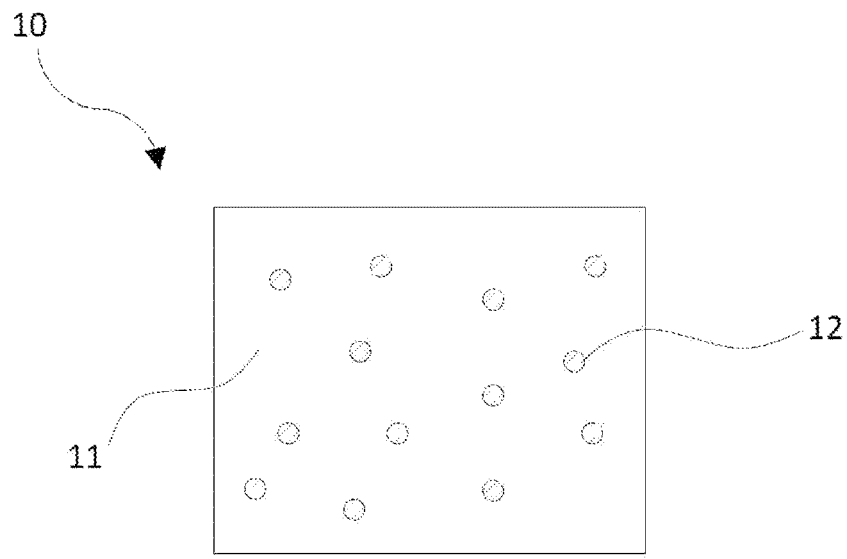
FIG. 1 is a schematic view showing a surface of an elastic body constituting an anti-slip member for wearable equipment or sports equipment according to one embodiment.

First, an embodiment of anti-slip member for wearable equipment or sports equipment of the present invention will be described with reference to FIG. 1 to FIG. 3. FIG. 1 is a schematic view showing a surface of an elastic body 10 forming an anti-slip member for wearable equipment or sports equipment of this embodiment. The elastic body 10 of this embodiment includes an elastomer 11 and a hydrogel 12, and at least part of the hydrogel 12 is dispersed on the surface of the elastic body 10. The wearable equipment as used herein means equipment, which a user wears or carries when in use, and examples of which include exercise shoes, work shoes, cold-proof shoes, daily shoes, a wearable article, a glove, and spectacles. The sports equipment as used herein means equipment, which a user uses for exercises (in particular, as a form to be gripped by the user), and equipment not included in the aforementioned wearable equipment, examples of which include a bat, a racket, and a golf club (the anti-slip member of the present invention is provided mainly on grips of these items of goods). Examples of the equipment further include a grip and grip tape to be supplied to these items of the goods. The term "exercise" as used herein means whole physical activities, that is, human physical activities, examples of which include physical activities involved in sports, athletics, exercises, recreations, or the like. The term "surface" as used herein means an exterior boundary at which the elastomer and the elastic body make contact with an object when the anti-slip member is provided in or on the sports equipment. For example, when the anti-slip member is provided in a shoe sole of a shoe, the surface of each of the elastomer and the elastic body means an exterior boundary at which the elastomer or the elastic body makes contact with the ground, and does not include the exterior boundary at which the elastomer and the elastic body are bonded to the shoe and do not make contact with the ground.

Figure 2:
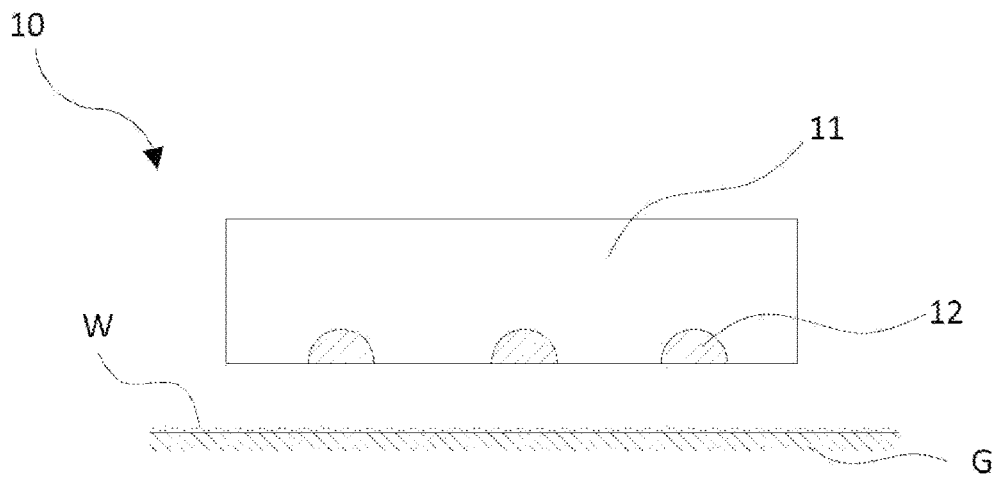
FIG. 2 is a schematic view showing the elastic body of FIG. 1 before it makes contact with an object wet by water.

FIG. 2 is a schematic view showing the elastic body 10 forming the anti-slip member of this embodiment before it makes contact with an object G wet by water W. FIG. 3 is a schematic view showing the elastic body 10 embodiments of the anti-slip member of this embodiment after it makes contact with the object G wet by water W. The object G is herein represented as the ground wet by water W. The hydrogel 12 has a higher affinity to water W than the elastomer 11. Therefore, according to this configuration, when the surface of the elastic body 10 makes contact with the object G wet by water W, the water W on the object G tends to make contact with the hydrogel 12 in a dispersed manner on the surface, and therefore comes together or accumulates at the positions provided with the hydrogel 12, as shown in FIG. 3. This causes the water W interposed between the elastomer 11 exposed on the surface of the elastic body 10 and the object G to decrease and hence causes the contact area between the elastomer 11 and the object G to increase. Therefore, the elastic body 10 of this embodiment can exhibit a high gripping performance to the object G wet by water W and thus has improved wet-grip performance.

Figure 3:
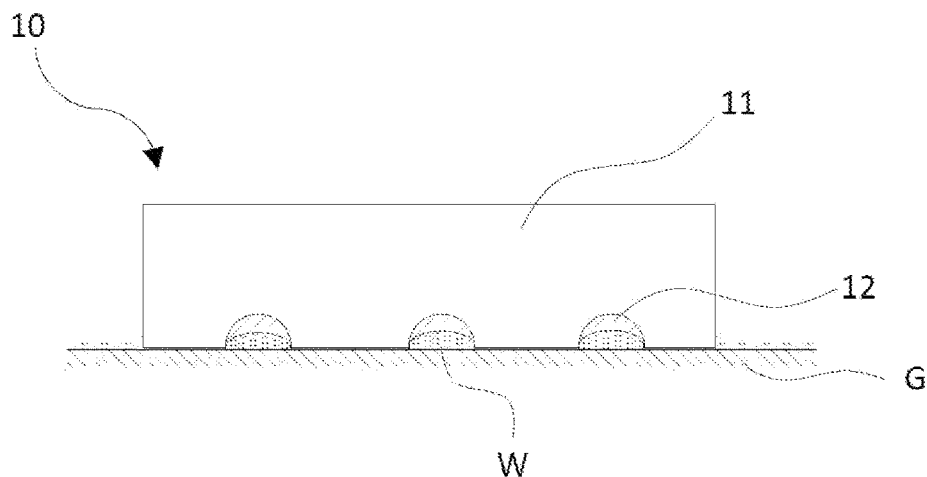
FIG. 3 is a schematic view showing the elastic body of FIG. 1 after it makes contact with the object wet by water.

In the embodiment where the hydrogel 12 has a compression elastic modulus lower than the elastomer 11, the hydrogel 12 is pushed inwardly by water W and brought into a compressed state as shown in FIG. 3 when the surface of the elastic body 10 makes contact with the object G wet by water W. Thereby, water W which has accumulated at the positions provided with the hydrogel 12 can be trapped between the object G and the hydrogel 12 so that water W which has accumulated at the positions provided with the hydrogel 12 barely seeps between the elastomer and the object G. Thus, the contact area between the elastomer 11 and the object G can be more surely secured and thereby the wet-grip performance can be more effectively improved.

In the elastic body 10, the hydrogel 12 is substantially uniformly dispersed across the surface of the elastic body 10. Thereby, in the elastic body 10, water W interposed between the object G and the elastomer 11 exposed on the surface of the elastic body 10 can be effectively guided underneath the hydrogel 12 on the entire surface of the elastic body 10. Therefore, the wet-grip performance can be more effectively improved in the entire surface of the elastic body 10. It is to be noted that, in the elastic body 10, dispersion of the hydrogel 12 across the surface of the elastic body 10 as mentioned above is not essential. Even a hydrogel dispersion part formed by uneven distribution of the hydrogel 12 on a certain area of the surface of the elastic body 10 can also improve the wet-grip performance of the elastic body 10.

The ratio of the area occupied by the hydrogel 12 dispersed on the surface of the elastic body 10 is not particularly limited, but is, for example, in a range of 1 to 25%, preferably 5 to 25%, more preferably 5 to 20% of the entire area of the surface of the elastic body 10. The ratio of the area occupied by the hydrogel 12 falling within the above range enables the water W wetting the object to effectively accumulate at the positions provided with the hydrogel 12 so that the wet-grip performance of the elastic body 10 can be effectively exhibited. Here, it is preferable that the hydrogel 12 dispersed on the surface of the elastic body 10 be substantially evenly dispersed in the form of small particles. The hydrogel 12 being evenly dispersed in the form of small particles enables water W wetting the object to more effectively accumulate at the positions provided with the hydrogel 12. An average particle size of the hydrogel 12 is preferably 0.01 to 1000 μm, more preferably 0.01 to 100 μm.

FIG. 1 shows the hydrogel 12 dispersed on the surface of the elastic body 10, but the hydrogel 12 of the elastic body 10 of this embodiment can be also dispersed inside the elastic body 10. In such an embodiment, even if the surface of the elastic body 10 is worn away and the hydrogel 12 exposed on the surface of the elastic body 10 is lost, the hydrogel 12 dispersed inside the elastic body 10 is subsequently exposed on the elastic body 10. Thus, the wet-grip performance of the elastic body 10 is less likely to deteriorate with age so that the elastic body 10 can have improved durability.

The dispersion of the hydrogel 12 inside the elastic body 10 causes a decrease in the compression elastic modulus and the rigidity of the elastic body 10 and increase in the flexibility of the elastic body 10. Thereby, an effect of increasing the shock absorbability and the grip performance of the elastic body 10 is also produced. The amount of the hydrogel 12 dispersed inside the elastic body 10 is not particularly limited, but is preferably set to an appropriate amount while taking into account the influences on the compression elastic modulus and the hardness of the elastic body 10 constituting the anti-slip member. The amount of the hydrogel 12 dispersed inside the elastic body 10 is preferably 1 to 15% by weight, more preferably 5 to 10% by weight. The hydrogel 12 dispersed inside the elastic body 10 preferably has a small particle size in order to suppress deterioration of the mechanical strength of the elastic body 10 forming the anti-slip member. Even from this point of view, the average particle size of the hydrogel 12 is preferably 0.01 to 1000 μm, more preferably 0.01 to 100 μm.

The hardness of the elastic body 10 of this embodiment can be appropriately set according to the intended use of the anti-slip member. For example, when the anti-slip member is used for a shoe sole of a shoe, the hardness of the elastic body 10 is preferably in a range of 55 to 75 in the type A durometer hardness according to JIS K 6253-3:2012. For the anti-slip member used for the grip of a bat or racket, or used for a glove or wear, the hardness of the elastic body 10 is preferably in a range of 40 to 60 in the type A durometer hardness.

The average particle size of the hydrogel 12 dispersed on the surface of the elastic body 10 can be herein determined by randomly selecting 10 to 20 particles of the hydrogel 12 seen on the surface of the elastic body 10, measuring individually the major axis diameter of each of these particles, and arithmetically averaging the obtained measured values for them. The average particle size of the hydrogel 12 dispersed inside the elastic body 10 can be also determined by performing a similar measurement on two or more cross sections of the elastic body 10, and arithmetically averaging the obtained measured values for these cross sections.

An elastomer generally used as an anti-slip material, which can exhibit sufficient grip performance to the object with which the elastomer makes contact, is used as the elastomer 11. Examples of the elastomer include a vulcanized rubber such as a natural rubber (NR), an isoprene rubber (IR), a butadiene rubber (BR), a styrene butadiene rubber (SBR), a chloroprene rubber (CR), an acrylonitrile butadiene rubber (NBR), a butyl rubber (IIR), and a silicone rubber (Si); and a thermoplastic elastomer such as a styrene-based elastomer (TPS), an olefin-based elastomer (TPO), a urethane-based elastomer (TPU), a polyester-based elastomer (TPEE), polyamide-based elastomer (TPA), polyvinyl chloride (PVC), and an ethylene-vinyl acetate copolymer (EVA). These may be solely used, or two or more kinds of them may be used in combination with each other.

It is preferable that an appropriate elastomer be selected as the elastomer 11 according to the characteristics required for the wearable equipment or sports equipment for which the anti-slip member is used. For example, when the anti-slip member is used for a shoe sole of a shoe, BR, SBR, NR, or IR, which is excellent in tensile strength, tear strength, and abrasion resistance, is appropriately selected as the elastomer 11.

It is preferable that the elastomer 11 have high water repellency as contrasted with the hydrogel 12. For example, the water contact angle of the elastomer 11 is preferably 80° or more, more preferably 100° or more.

The hydrogel 12 is a gel formed by dispersing a hydrogel material in water as a dispersant. Examples of the hydrogel include a polyvinyl alcohol gel, an acrylic polymer gel, a urethane-based gel, a polyethylene glycol gel, a polyethylene oxide gel, and a silicone gel. One type of the hydrogel can be included, and/or a plurality of types of hydrogel can be included. The amount of the dispersant included in the hydrogel 12 is not particularly limited, but, for example, is preferably 1 to 99% by weight, more preferably 5 to 20% by weight, based on the entire hydrogel 12. The dispersant of the hydrogel can further include a hydrophilic organic solvent in addition to water. Examples of the hydrophilic organic solvent include an organic solvent including a hydroxyl group, an amino group, or an amide group.

The hydrogel 12 can be a crosslinked body or a non-crosslinked body. However, since the hydrogel 12 needs to be stably present on the surface of the elastic body 10 when the anti-slip member including the elastic body 10 is used, the crosslinked body, which is more stably present, is preferable.

When the hydrogel 12 is a crosslinked body, it is preferable that the hydrogel 12 be a crosslinked body chemically crosslinked by adding a crosslinking agent. This is because the chemically crosslinked body which is irreversibly crosslinked is highly stable. However, if the crosslinked state of the hydrogel 12 does not substantially collapse due to the temperature or mechanical impact at the time of use or manufacture of the elastic body 10 and the anti-slip member provided therewith, the hydrogel 12 can be a crosslinked body physically crosslinked by a freeze-thaw method or the like.

When the hydrogel 12 is a chemically crosslinked body, the hydrogel 12 can further include a crosslinking agent. Examples of the crosslinking agent include a boron compound such as borax, an organic titanium compound such as titanium lactate, titanium aminoethylaminoethanolate, or titanium triethanolaminate, and an organic zirconium compound such as zirconyl chloride. Among these, the crosslinking agent is preferably an organic titanium compound in terms of abrasion resistance, and particularly, titanium triethanolaminate, which has a very high crosslinking efficiency, is preferable. The amount of the crosslinking agent included in the chemically crosslinked hydrogel 12 is not particularly limited as long as the hydrogel 12 is sufficiently crosslinked, and can be 1 to 10% by weight, preferably 1 to 5% by weight, more preferably 1 to 2% by weight based on the entire hydrogel 12. In particular, when the crosslinking agent is titanium triethanolaminate having a high crosslinking efficiency, it is considered that the hydrogel 12 is sufficiently crosslinked if the crosslinking agent is included in an amount of 1 to 2% by weight based on the entire hydrogel 12.

In particular, a hydrogel including a polyvinyl alcohol gel is preferable as the hydrogel 12. This is because the polyvinyl alcohol gel has a relatively high hydrophilicity and further has a very high stability when a crosslinked body is formed. When the hydrogel 12 is the polyvinyl alcohol gel, it preferably has a high saponification degree in order to increase the hydrophilicity of the polyvinyl alcohol gel. Specifically, the saponification degree of polyvinyl alcohol is preferably 80 to 100%, more preferably 88 to 100%, most preferably 98 to 100%.

As the other hydrogel 12, a hydrogel including a silicone hydrogel is preferable. This is because the silicone hydrogel encapsulates water and has a relatively high hydrophilicity and a low elasticity.

Examples of the still another hydrogel 12 include an acrylic polymer gel such as a polyacrylamide gel, a sodium polyacrylate gel, or a polyacrylonitrile gel, and a urethane-based gel. These gels are also known for their relatively high hydrophilicity.

The molecular weight of the hydrogel 12 is not particularly limited. The molecular weight of the hydrogel 12 can be appropriately selected, for example, from the viewpoint of handleability at the time of manufacturing the elastic body 10.

It is preferable that the hydrogel 12 have a high hydrophilicity. As the hydrophilicity of the hydrogel 12 is higher, water W wetting the object is more likely to accumulate at the positions provided with the hydrogel 12. The water contact angle of the hydrogel 12 is, for example, preferably 90° or less, more preferably 50° or less. Further, it is preferable that the difference between the hydrophilicity of the hydrogel 12 and the hydrophilicity of the elastomer 11 be large, and for example, a difference of 10° or more therebetween is preferable, a difference of 50° or more therebetween is more preferable.

Further, it is preferable that the hydrogel 12 have a small compression elastic modulus. If the compression elastic modulus of the hydrogel 12 is small, water W which has accumulated at the positions provided with the hydrogel 12 is easily held between the compression-deformed hydrogel 12 and the object. From this viewpoint, the compression elastic modulus of the hydrogel 12 is preferably 10 MPa or less, more preferably 1 MPa or less, for example. Further, it is preferable that the difference between the compression elastic modulus of the hydrogel 12 and the compression elastic modulus of the elastomer 11 be large, and for example, a difference of 5 MPa or more therebetween is preferable, a difference of 10 MPa or more therebetween is more preferable. When the hydrogel 12 is also dispersed inside the elastomer 11, it is preferable to set the compression elastic modulus of the hydrogel 12 to an appropriate value while taking into consideration the influence on the compression elastic modulus and the hardness of the elastic body 10.

The elastic body 10 of this embodiment can further include a silane coupling agent in order to suppress the hydrogel 12 from desorbing from the surface of the elastomer 11 when the anti-slip member is in use. Examples of the silane coupling agent include alkylsilane, vinylsilane, aminosilane, mercaptosilane, and bis(3-triethoxysilylpropyl)tetrasulfide (Si69), and, among them, bis(3-triethoxysilylpropyl)tetrasulfide is suitably used. These silane coupling agent can be solely used, or two or more kinds of the silane coupling agents can be used in combination with each other.

The content of the silane coupling agent in the elastic body 10 may be 0.1 to 10% by weight, preferably 0.2 to 5% by weight, more preferably 0.5 to 1% by weight, based on the entire elastic body 10. It has been found that, when the content of the silane coupling agent in the elastic body 10 is 0.5 to 1% by weight, unexpectedly, a decrease in the abrasion resistance of the elastic body 10 caused by the incorporation of the hydrogel is greatly suppressed, or an effect of improving the abrasion resistance of the elastic body 10 occurs.

Further, in addition to the above components, the elastic body 10 of this embodiment may further include other optional components such as a vulcanizing agent, a vulcanization accelerator, a crosslinking accelerator, a filler, a plasticizer, an antioxidant, or an ultraviolet absorber.

The elastic body 10 of this embodiment can be produced by kneading the above components, that is, the elastomer 11 material, the hydrogel 12 material, and, optionally, the silane coupling agent, by any method generally carried out by a person skilled in the art. For example, a method of kneading the above components, for example, can including a A kneading or B kneading step using a rotary such as an open roll or a kneader can be used. At this time, when kneading is performed using a kneader, the hydrogel 12 can be dispersed in the elastomer 11 in a smaller particulate form, which is more preferable. The temperature at which the above components are kneaded is not particularly limited, and can be kneaded at 80 to 200° C., for example, can be kneaded preferably at 100 to 180° C. At this time, when the above components are kneaded at a high temperature of 100 to 180° C., excessive moisture contained in the hydrogel 12 material is removed, so that a defect portion which can be generated inside the elastomer 11 due to the hydrogel 12 material during kneading is minimized, and thereby the obtained elastic body 10 has a relatively high mechanical strength.

Wearable Equipment or Sports Equipment

The wearable equipment or sports equipment of embodiments of the present invention includes the anti-slip member (hereinafter referred also to as the anti-slip member 10) constituted by the elastic body 10. The wearable equipment or sports equipment of embodiments of the present invention is not particularly limited as long as it is equipment to be worn by the user or to be attached to the user at the time of use, or equipment to be used when the user performs exercise, and can be, for example, shoes, wears, gloves, spectacles, bats, rackets, golf clubs, or the like.

Figure 4:
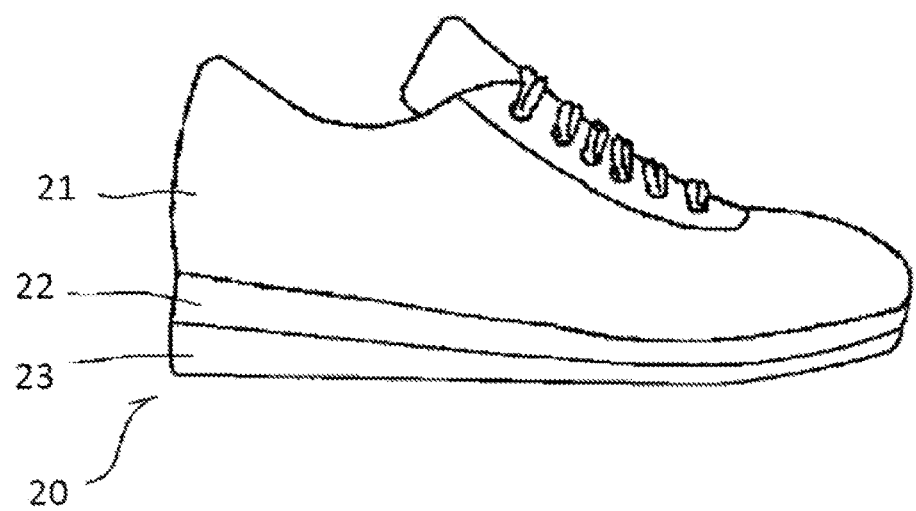
FIG. 4 is a schematic view showing a shoe as the wearable equipment of one embodiment, which has an anti-slip member provided at a ground engaging position of a shoe sole.

FIG. 4 is a schematic view showing a shoe 20 as the wearable equipment of one embodiment, which has an anti-slip member 10 provided at a ground engaging position of a shoe sole 23. The shoe 20 includes an upper member 21 covering the upper surface of the foot, and a midsole 22 and an outer sole 23 as a shoe sole arranged on the lower side of the upper member 21. Specifically, the shoe 20 is disposed at a ground engaging position, and includes the outer sole 23 provided with the anti-slip member 10, and the midsole 22 disposed between the upper member 21 and the outer sole 23. In this embodiment, the shoe 20 includes both the midsole 22 and the outer sole 23, but the shoe 20 does not necessarily include both of these elements. That is, the shoe 20 can include only the outer sole 23 provided with the anti-slip member 10 as the shoe sole, and can include no midsole 22. In this embodiment, the outer sole 23 can be formed of a foam in order to ensure the cushioning properties required for the midsole.

Figure 5:
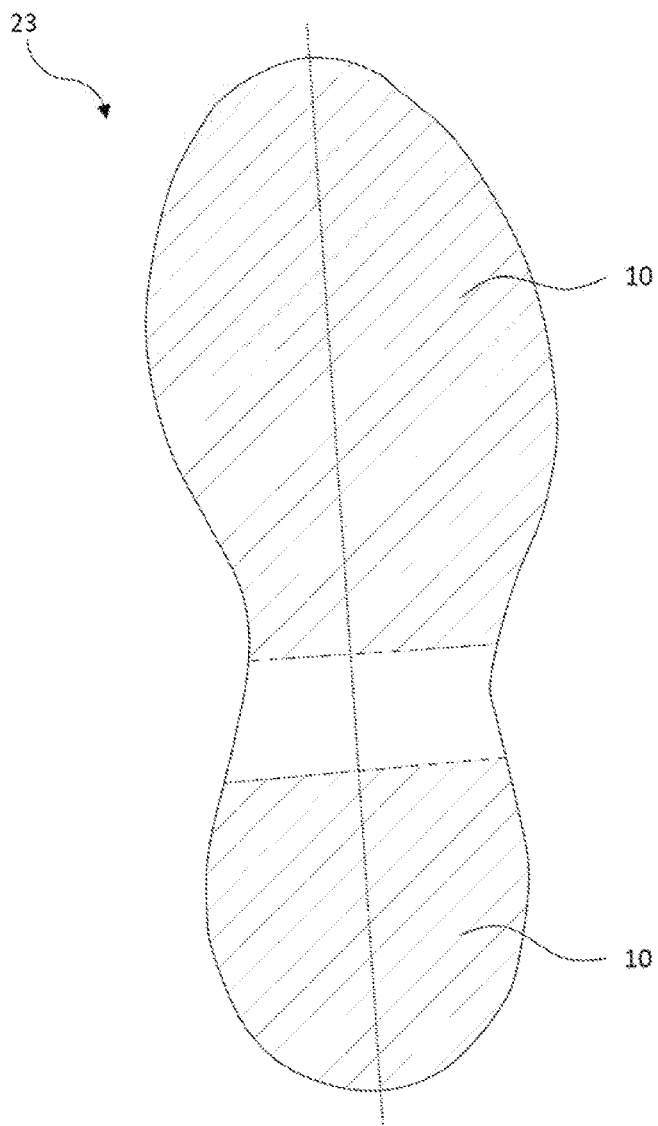
FIG. 5 is a bottom view of the shoe sole of the shoe of FIG. 4 with the anti-slip member provided therein.

FIG. 5 is a bottom view of the shoe sole (outer sole) 23 of the shoe 20 of FIG. 4 including the anti-slip member 10. In the shoe sole 23, as shown in FIG. 5, the anti-slip member 10 can be provided in a region positioned within a range of 0% to 60% of the shoe sole 23 with respect to the longitudinal direction (hereinafter, also referred to as a front region of the shoe sole 23) and in a region within a range of 70% to 100% of the shoe sole 23 with respect to the longitudinal direction (hereinafter, also referred to as a rear region of the shoe sole 23) when the toe-side end is 0% and the heel-side end is 100% of the shoe sole 23 with respect to the longitudinal direction. Preferably, the anti-slip member 10 is disposed in a region occupying 5 to 100% of the entire front region of the shoe sole 23, in a region occupying 5 to 100% of the entire rear region of the shoe sole 23, or in the both regions. Herein, the region positioned within the range of 0% to 60% of the shoe sole 23 with respect to the longitudinal direction means a region of the shoe sole 23 located closer to the toe side than a straight line defined by crossing, in a width direction at right angles, a longitudinal straight line passing through the toe-side end and the heel-side end at a point which is a 60% position of the longitudinal straight line. Similarly, the region positioned within the range of 70% to 100% of the shoe sole 23 with respect to the longitudinal direction means a region of the shoe sole 23 located closer to the heel side than a straight line which crosses in the width direction the longitudinal straight line at a 70% position defined in the same manner as above.

Particularly preferably, in the shoe sole 23, the anti-slip member 10 is provided at each of the positions corresponding to the heel, the metatarsophalangeal joints, and the toe of the wearer. In the shoe sole 23, the positions corresponding to the heel, the metatarsophalangeal joints, and toe are likely to exhibit grip performance because they frequently make contact with the ground, and the contact area of each of them is relatively large. Therefore, the wet-grip performance of the shoe 20 can be more effectively enhanced by arranging the anti-slip member 10 at each of these positions of the shoe sole 23.

However, in the shoe sole 23 of the shoe 20 of embodiments of the present invention, the position at which the anti-slip member 10 is provided is not particularly limited. For example, the anti-slip member 10 can be provided at at least one of positions of the shoe sole 23 respectively corresponding to the heel, the metatarsophalangeal joints, and the toe, and can be provided at another position different from these positions. The anti-slip member 10 can be disposed only in the front region of the shoe sole 23, or can be disposed only in the rear region. Further, the anti-slip member 10 can be provided on the entire surface of the shoe sole 23, and the entire shoe sole 23 can be formed of the anti-slip member 10.

In order for the shoe 20 to exhibit high wet-grip performance, it is preferable that the anti-slip member 10 disposed in the shoe sole 23 be configured to make contact with the ground through the widest possible area of the anti-slip member 10 when making contact with the ground. Therefore, unlike the conventionally known anti-slip member for the shoe sole, the anti-slip member 10 disposed in the shoe sole 23 preferably does not have a large unevenness on its surface, and more preferably has a flat surface.

The shoe 20 of this embodiment is improved in wet-grip performance to various types of ground including non-paved surfaces by the anti-slip member 10 provided in the shoe sole 23, and among others, wet-grip performance to a road surface paved with concrete, asphalt or the like is particularly enhanced. In contrast, it should be noted that the shoe 20 of this embodiment, due to its wet-grip-performance enhancing mechanism, is unlikely to improve wet-grip performance on a frozen ground or ice.

Although the anti-slip member 10 of this embodiment is formed by the elastic body 10 with the hydrogel dispersed on the surface, the anti-slip member can be formed by a combination of the elastic body 10 and a conventional elastic body having a surface provided with unevenness for slip prevention and having no hydrogel dispersed thereon. Further, the anti-slip member can be integrally molded as an elastic body provided with both a surface on which a hydrogel is dispersed and a surface on which a hydrogel is not dispersed.

Figure 6:
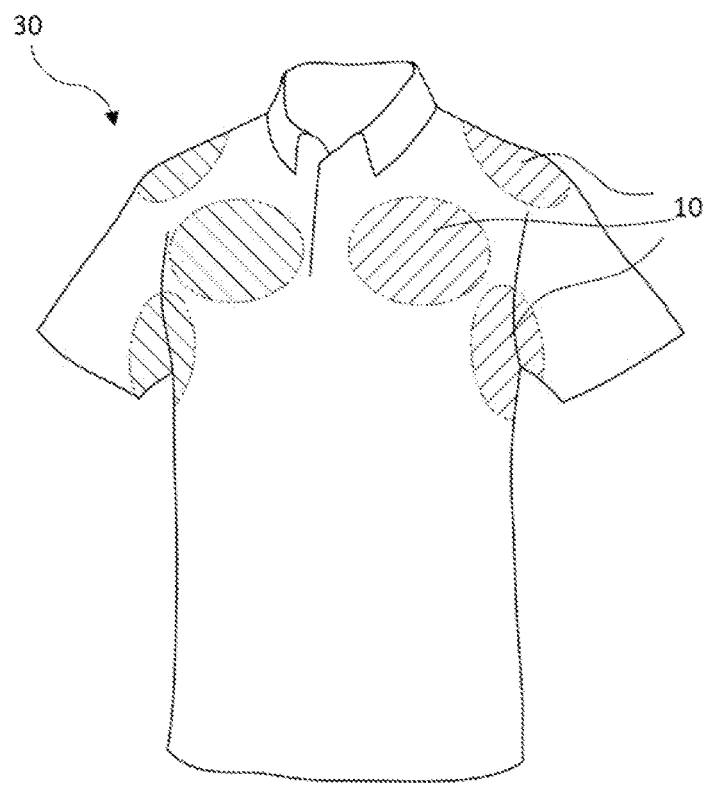
FIG. 6 is a plan view of a rugby wear as the wearable equipment of one embodiment.

FIG. 6 shows rugby wear 30 as one embodiment of the wearable equipment of the present invention. In the rugby wear 30, as shown in FIG. 6, the anti-slip member 10 can be disposed around each of the breast portions of the front body, the shoulder portions, and the armpit portions. The breast portions of the front body and their peripheries, and the armpit portions and their peripheries make contact with a ball as the object when the ball is held by a rugby player during a rugby game. Therefore, the rugby player wearing the rugby wear 30 in which the anti-slip member 10 is provided at each of these portions can enjoy an effect of making it difficult to have the ball slip when wet by perspiration out of these portions. In addition, the shoulder portions come into contact with the shoulders of a competing player when they form a scrum in the rugby game. Therefore, a rugby player wearing the rugby wear 30 in which the anti-slip member 10 is disposed at each of these portions can enjoy the effect of increased difficulty of slippage on the shoulder portions when forming the scrum.

Figure 7:
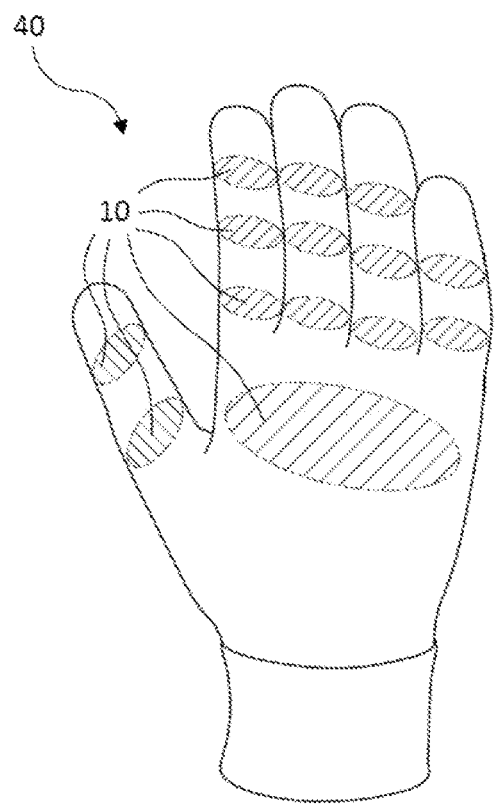
FIG. 7 is a plan view of a glove as the wearable equipment of one embodiment.

FIG. 7 shows a sports glove 40 as one embodiment of the wearable equipment of the present invention. In the sports glove 40, as shown in FIG. 7, the anti-slip member 10 can be disposed between portions around the joints of each of the finger bones, as well as around the tips of the metacarpal bones. A player wearing the sports glove 40 in which the anti-slip member 10 is disposed at each of these portions can enjoy the effect of increased difficulty of slippage out of the glove 40 while holding the object wet by water or perspiration.

In one embodiment of the sports equipment of embodiments of the present invention, the anti-slip member 10 can be disposed on the grip of sports equipment such as a bat, a racket or a golf club. Such sports equipment with the anti-slip member 10 disposed on the grip has the effect of increased difficulty of slippage of the grip wet by water or perspiration to be slippery, and therefore enabling the user to easily hold the sports equipment stably.

As described above, the anti-slip member for the wearable equipment or sports equipment of this embodiment is constituted by the elastic body including the elastomer and the hydrogel, and at least part of the hydrogel is dispersed across the surface of the elastic body. Thus, high grip performance can be exhibited even for an object wet by water, and therefore, the wet-grip performance is improved. Further, since the wearable equipment or sports equipment of this embodiment includes the anti-slip member, it is possible to provide the wearable equipment or sports equipment with an improved wet-grip performance.

The anti-slip member for the wearable equipment or sports equipment, the wearable equipment, and the sports equipment according to embodiments of the present invention are not limited to the configuration of the aforementioned embodiment. Further, the anti-slip member for the wearable equipment or sports equipment, the wearable equipment, and the sports equipment according to embodiments of the present invention are not limited to those having the aforementioned operational effects. Various modifications can be made to the anti-slip member for the wearable equipment or sports equipment, the wearable equipment, and the sports equipment according to embodiments of the present invention without departing from the gist of the present invention.

Although a detailed description beyond the above will not be repeated here, conventionally known technical matters on wearable equipment or sports equipment, wearable equipment, and sports equipment may be optionally employed in embodiments of the present invention even if the matters are not directly described in the above.

EXAMPLES

Hereinafter, embodiments of the present invention will be elucidated by way of specific examples and comparative examples of the present invention. However, the present invention is not limited to the following examples.
Elastic Body in which Hydrogel Particles are Dispersed in Vulcanized Rubber As a raw material of a vulcanized rubber as an elastomer, the following materials were used.

Polymer: 100 parts by weight of IR2200 (manufactured by Nippon Zeon Co., Ltd., isoprene rubber)
Processing aid: 2 parts by weight of stearic acid 50S (manufactured by Shin Nippon Rika Co., Ltd., bead shape)
Activating agent: 5 parts by weight of Activated Zinc Oxide No. 2 (manufactured by Honjo Chemical Co., Ltd.)
  1 part by weight of PEG #4000 (manufactured by Nippon Oil & Fat Co., Ltd.)
Filler: 35 parts by weight of VN3 (manufactured by Degussa Japan Co., Ltd., silica-based inorganic filler)
Plasticizer: 20 parts by weight of P-200 (manufactured by JTXG Corporation, processed oil)
Coupling agent: 3.5 parts by weight of Si69 (manufactured by Degussa Japan Co., Ltd., bis[3-(triethoxysilyl)propyl]pertetrasulfide, for rubber/silica interface)
Anti-aging agent: 1 part by weight of NOCRAC 200 (manufactured by Ouchi Shinko Chemical Industrial Co., Ltd., 2,6-di-tert-butyl-4-methylphenol)
Vulcanizing agent: 2 parts by weight of Sulfur #200 (manufactured by Hosoi Chemical Co., Ltd.)
Vulcanization accelerator: 1 part by weight of ACTING SL (manufactured by Mitsubishi Chemical Corporation, organic amine)
  2 parts by weight of NOCCELER D (manufactured by Ouchi Shinko Chemical Industrial Co., Ltd., DPG)
  2 parts by weight of NOCCELER DM (manufactured by Ouchi Shinko Chemical Industrial Co., Ltd., MBTS)

Further, as a raw material of a polyvinyl alcohol gel as the hydrogel, the following materials were used.

Polyvinyl alcohol: 165-17915 (manufactured by FUJIFILM Wako Pure Chemical Industries, Ltd., saponification degree of 80 mol %)
  : 160-03055 (manufactured by FUJIFILM Wako Pure Chemical Industries, Ltd., saponification degree of 88 mol %)
  : 160-11485 (manufactured by FUJIFILM Wako Pure Chemical Industries, Ltd., saponification degree of 98 mol %)
Plasticizer: ion-exchanged water
Crosslinking agent: TC-400 (manufactured by Matsumoto Fine Chemical Co., Ltd., titanium diisopropoxybis (triethanolaminate))

These materials were blended in the weight ratios shown in Table 1 below to prepare polyvinyl alcohol gels (a) to (g).

TABLE 1

|  |  | (a) | (b) | (c) | (d) | (e) | (f) | (g) |
|---|---|---|---|---|---|---|---|---|
| Polymer | PVA (saponification degree of 80 mol %) | 20 |  |  |  |  |  |  |
|  | PVA (saponification degree of 88 mol %) |  | 20 |  |  |  |  |  |
|  | PVA (saponification degree of 98 mol %) |  |  | 20 | 20 | 20 | 20 | 20 |
| Plasticizer | Ion-exchanged water | 80 | 80 | 80 | 80 | 80 | 80 | 80 |
| Crosslinking agent | TC-400 | 10 | 10 | 10 |  | 0.02 | 0.2 | 2 |

When an additional silane coupling agent for coupling the interface between the vulcanized rubber and the polyvinyl alcohol gel was to be used in addition to the silane coupling agent included in the above raw materials of the rubber, the following silane coupling agent was used.

Coupling agent: Si69 (manufactured by Degussa Japan Co., Ltd., bis[3-(triethoxysilyl)propyl]pertetrasulfide, for rubber/PVA gel interface)

Examples 1 to 15

Elastic bodies in each of which polyvinyl alcohol gel particles were dispersed on the surface and inside of the vulcanized rubber were prepared in the following manner, respectively. First, all of the raw materials of the above-mentioned vulcanized rubber, except for the vulcanizing agent and the vulcanization accelerator, were kneaded at 80 to 130° C. for 15 minutes using a kneader (device name: DS3-10MWB, manufactured by Nippon Spindle Manufacturing Co., Ltd.). The raw material of the rubber thus obtained, a polyvinyl alcohol gel selected from Table 1 above, and optionally an additional silane coupling agent were blended in the blending ratios shown in Table 2 below, and kneaded together with the aforementioned vulcanizing agent and vulcanization accelerator at 25 to 60° C. for 10 minutes using an open roll (device name: KD-M2-8, KNEADER MACHINERY CO., LTD.). The raw material of the elastic body thus obtained was introduced into a molding die having a flat plate shape, and pressed at 160° C. for 5 minutes using a device (name: Ram diameter of 12" 150 tons (manufactured by Nimei Koki Co., Ltd.)), thereby obtaining an elastic body molded into a flat plate shape having a thickness of 2 mm. In the obtained elastic body, it was confirmed by measurement of the polyvinyl alcohol gel coverage ratio described later that the polyvinyl alcohol gel particles (average particle size: 100 to 200 μm) microparticulated by kneading were dispersed on the surface of the vulcanized rubber.

Comparative Example 1

An elastic body molded into a flat plate shape having a thickness of 2 mm was obtained in the same manner as in Examples 1 to 15, except that the polyvinyl alcohol gel was not kneaded.

Measurement of Polyvinyl Alcohol Gel Coverage Ratio

The elastic bodies of Examples 1 to 15 were immersed in an aqueous solution containing 1 to 100 ppm of fluorescein sodium salt for one hour. Subsequently, each of the elastic bodies was taken out from the aqueous solution, and the aqueous solution adhering to the elastic body was wiped off using a nonwoven fabric, and then the surface of the elastic body was irradiated with blue light in a dark chamber. Green fluorescence attributable to the polyvinyl alcohol gel was seen on the surface. An image of the surface of the elastic body showing this fluorescence was captured by a camera, and the ratio of the area of the polyvinyl alcohol gel exposed on the surface of the elastic body (polyvinyl alcohol gel coverage ratio) was calculated by obtaining a green luminance distribution.

Hardness Measurement

The hardness of each of the elastic bodies of Examples 1 to 15 and Comparative Example 1 was measured using "Asker Rubber Hardness Meter Type A" manufactured by Kobunshi Keiki Co., Ltd., as an Asker A hardness meter. The results are shown in Table 2 below.

Friction Test 1

The static friction coefficient and dynamic friction coefficient of each of the elastic bodies of Examples 1 to 15 and Comparative Example 1 were measured by sliding a probe over the elastic body wet by water. Specifically, at an ambient temperature of 24° C. and a relative humidity (RH) of 75%, the surface of each of the elastic bodies molded into a flat plate shape was wet by water, and an aluminum probe having a columnar shape (10 mm in diameter and 6.0 mm in length) was disposed on the water-wet surface of the elastic body so that the surface of the elastic body and the side face of the columnar body were in contact with each other. Thereafter, the columnar body was slid on the surface of the elastic body in a direction orthogonal to the length direction of the probe at a vertical load of 0.981 N and a sliding speed of 10.0 mm/s, and the static friction coefficient and the dynamic friction coefficient at that time were measured.

Friction Test 2

Before performing the friction test, the elastic bodies of Examples 1 to 15 and Comparative Example 1 were placed in water at the same temperature as the ambient temperature in advance, and left to stand for one hour. Thereafter, each of the elastic bodies was taken out from water, and then the static friction coefficient and dynamic friction coefficient thereof were measured in the same manner as in the friction test 1.

The static friction coefficients and dynamic friction coefficients of the elastic bodies of Examples 1 to 15 and Comparative Example 1 obtained by these friction tests are shown in Table 2 below.

TABLE 2

| | PVA Gel | | | Coupling agent | | Friction coefficient (Friction test 1) | | Friction coefficient (Friction test 2) | |
| --- | --- | --- | --- | --- | --- | --- | --- | --- | --- |
| | Type | Content (% by weight based on the entire elastic body) | Coverage ratio (%) | (vulcanized rubber-gel) Content (% by weight based on PVA gel) | Hardness ASKER-A | Static friction coefficient | Dynamic friction coefficient | Static friction coefficient | Dynamic friction coefficient |
| C. Ex. 1 | — | 0.0 | 0.0 | 0.0 | 61 | 0.85 | 0.69 | 0.89 | 0.71 |
| Ex. 1 | (c) | 1.0 | 4.9 | 0.0 | 62 | 1.57 | 1.12 | 0.90 | 0.72 |
| Ex. 2 | (c) | 5.0 | 14.0 | 0.0 | 61 | 1.69 | 1.39 | 0.83 | 0.70 |
| Ex. 3 | (c) | 10.0 | 21.4 | 0.0 | 61 | 1.51 | 1.22 | 0.87 | 0.68 |
| Ex. 4 | (c) | 1.0 | 4.9 | 10.0 | 62 | 1.61 | 1.21 | 1.56 | 1.18 |
| Ex. 5 | (c) | 5.0 | 14.0 | 10.0 | 62 | 1.71 | 1.41 | 1.67 | 1.44 |
| Ex. 6 | (c) | 10.0 | 21.4 | 10.0 | 62 | 1.53 | 1.22 | 1.52 | 1.25 |
| Ex. 7 | (c) | 5.0 | 14.0 | 0.1 | 61 | 1.64 | 1.34 | 1.02 | 0.82 |
| Ex. 8 | (c) | 5.0 | 14.0 | 0.5 | 61 | 1.74 | 1.45 | 1.56 | 1.23 |
| Ex. 9 | (c) | 5.0 | 14.0 | 1.0 | 62 | 1.69 | 1.39 | 1.61 | 1.42 |
| Ex. 10 | (d) | 5.0 | 14.0 | 10.0 | 62 | 1.67 | 1.50 | 1.36 | 1.21 |
| Ex. 11 | (e) | 5.0 | 14.0 | 10.0 | 62 | 1.54 | 1.25 | 1.58 | 1.56 |
| Ex. 12 | (f) | 5.0 | 14.0 | 10.0 | 63 | 1.66 | 1.38 | 1.74 | 1.45 |

TABLE 2-continued

| | | PVA Gel | | Coupling agent | | Friction coefficient (Friction test 1) | | Friction coefficient (Friction test 2) | |
|---|---|---|---|---|---|---|---|---|---|
| | Type | Content (% by weight based on the entire elastic body) | Coverage ratio (%) | (vulcanized rubber-gel) Content (% by weight based on PVA gel) | Hardness ASKER-A | Static friction coefficient | Dynamic friction coefficient | Static friction coefficient | Dynamic friction coefficient |
| Ex. 13 | (g) | 5.0 | 14.0 | 10.0 | 62 | 1.68 | 1.40 | 1.70 | 1.50 |
| Ex. 14 | (a) | 5.0 | 14.0 | 10.0 | 60 | 1.28 | 1.01 | 1.36 | 1.07 |
| Ex. 15 | (b) | 5.0 | 14.0 | 10.0 | 59 | 1.67 | 1.38 | 1.69 | 1.42 |

Evaluation of Friction Tests

The evaluation for the above friction tests will be described below with reference to FIGS. 8 to 12 based on the results shown in Table 2.

Effect by Hydrogel

Figure 8:
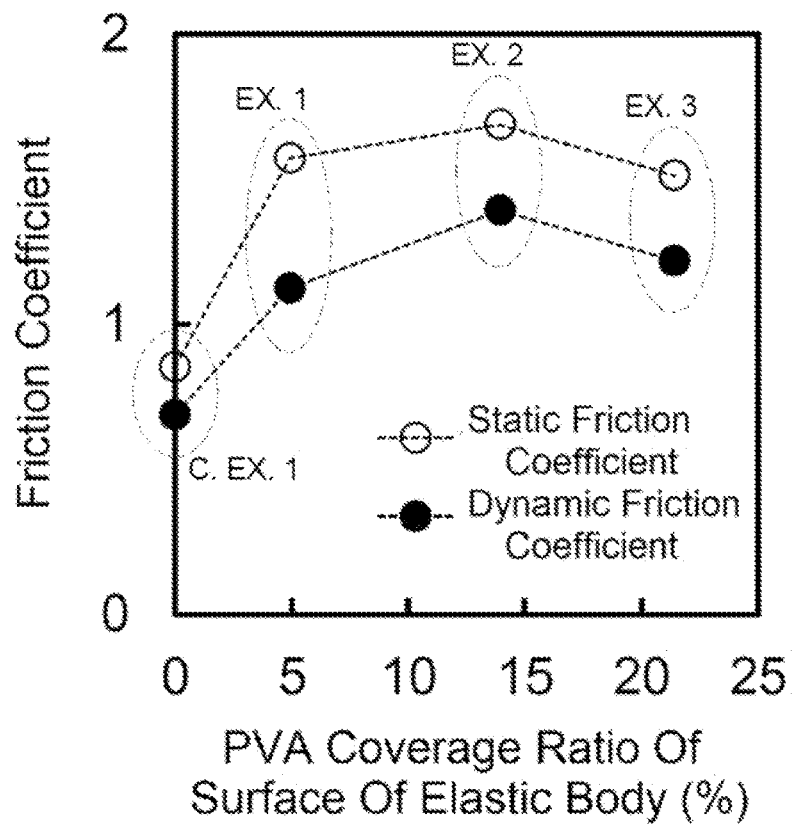
FIG. 8 is a graph representing static friction coefficients and dynamic friction coefficients of elastic bodies of Examples and a Comparative Example.
Figure 9:
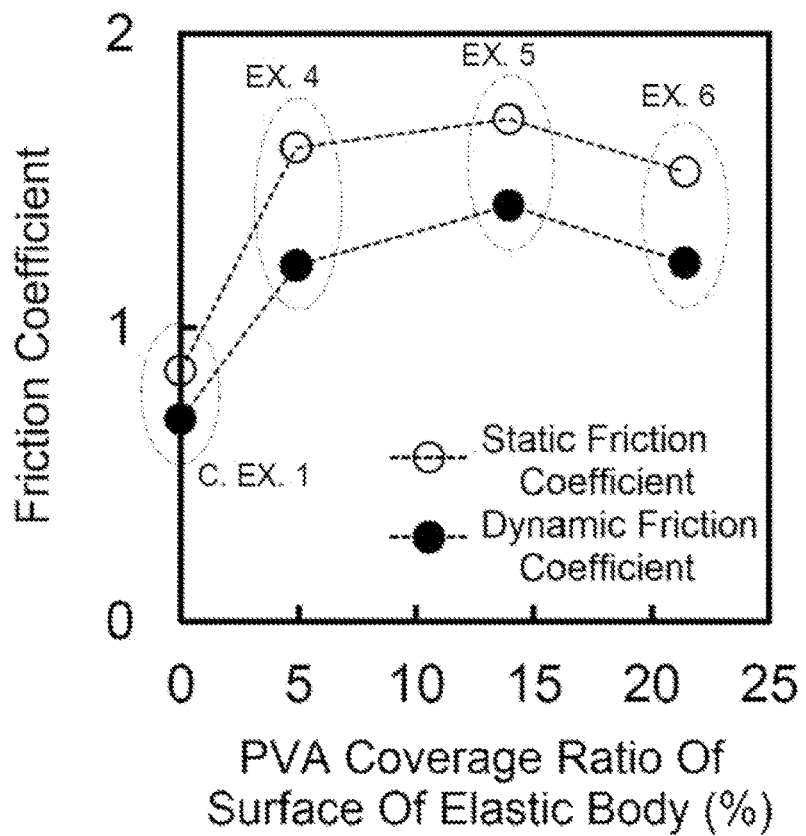
FIG. 9 is a graph representing static friction coefficients and dynamic friction coefficients of elastic bodies of Examples and a Comparative Example.

FIGS. 8 and 9 are graphs each representing the relationship between the blending amount of the polyvinyl alcohol gel and the static and dynamic friction coefficients in the friction test 1 for the elastic bodies of Comparative Example 1 and Examples 1 to 6. As can be seen from FIG. 8 and FIG. 9, the elastic bodies of Examples 1 to 6 in each of which the hydrogel particles are dispersed on the surface of the vulcanized rubber have static and dynamic friction coefficients, both of which are significantly enhanced in a state of being wet by water, as compared with the elastic body of Comparative Example 1 in which the hydrogel is not included. It can also be seen that each of the elastic bodies of Examples 4 to 6 shown in FIG. 9, which includes the additional silane coupling agent to couple the interface between the vulcanized rubber and the hydrogel, exhibits the static friction coefficient and dynamic friction coefficient equivalent to those of the elastic bodies of Examples 1 to 3 shown in FIG. 8 without the silane coupling agent.

Figure 10:
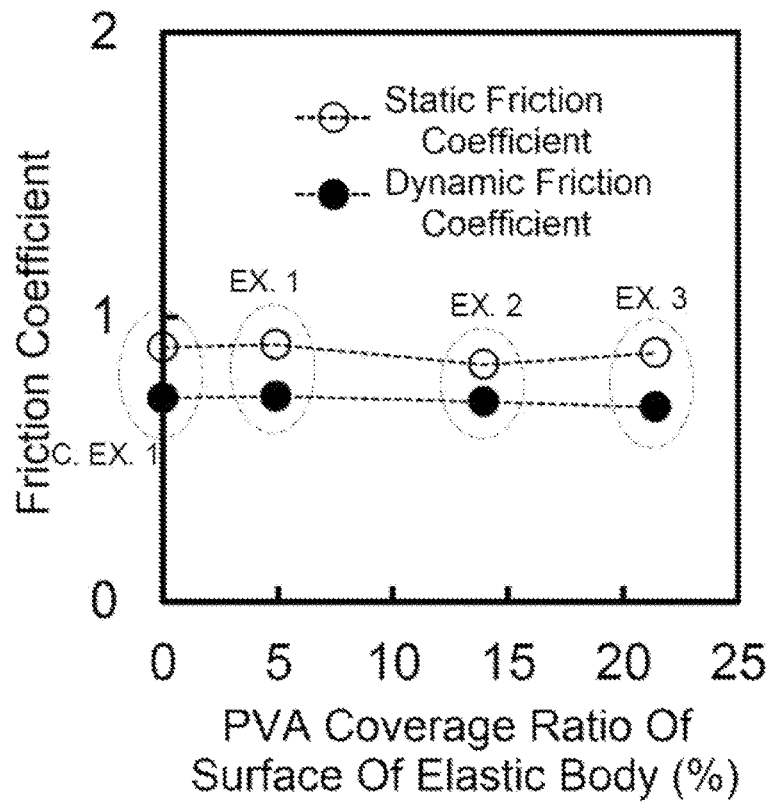
FIG. 10 is a graph representing static friction coefficients and dynamic friction coefficients of elastic bodies of Examples and a Comparative Example.
Figure 11:
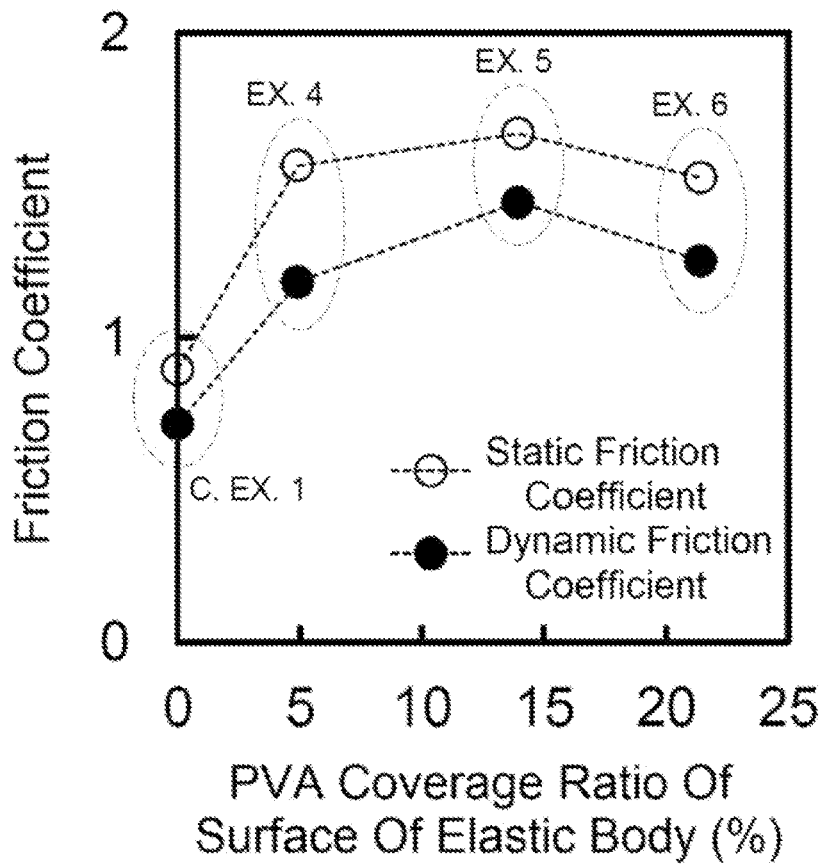
FIG. 11 is a graph representing static friction coefficients and dynamic friction coefficients of elastic bodies of Examples and a Comparative Example.

Effect by Silane Coupling Agent that Couples the Interface Between Vulcanized Rubber and Hydrogel FIG. 10 and FIG. 11 are graphs each representing the relationship between the blending amount of the polyvinyl alcohol gel and the static and dynamic friction coefficients in the friction test 2 for the elastic bodies of Comparative Example 1 and Examples 1 to 6. As can be seen from FIG. 10, the elastic bodies of Examples 1 to 3 were left in water for one hour, so that the effect of improving the static friction coefficient and the dynamic friction coefficient by the hydrogel is lost. This is considered to be due to the fact that, when these elastic bodies are left in water for a long time, the hydrogel particles are desorbed from the surface of the vulcanized rubber. On the other hand, it can be seen that the elastic bodies of Examples 4 to 6 shown in FIG. 11 retain the effect of improving the static friction coefficient and the dynamic friction coefficient by the hydrogel even after being left in water for one hour. This is considered to be due to the fact that the hydrogel particles are barely desorbed from the surface of the vulcanized rubber because the silane coupling agent that couples the interface between the vulcanized rubber and the hydrogel causes the hydrogel particles to be firmly bonded to the surface of the vulcanized rubber. Therefore, it can be seen that the durability of the elastic bodies of Examples 4 to 6 when used under the conditions of being wet by water is greatly enhanced as compared with the elastic bodies of Examples 1 to 3.

Effect by Blending Amount of an Additional Silane Coupling Agent

Figure 12:
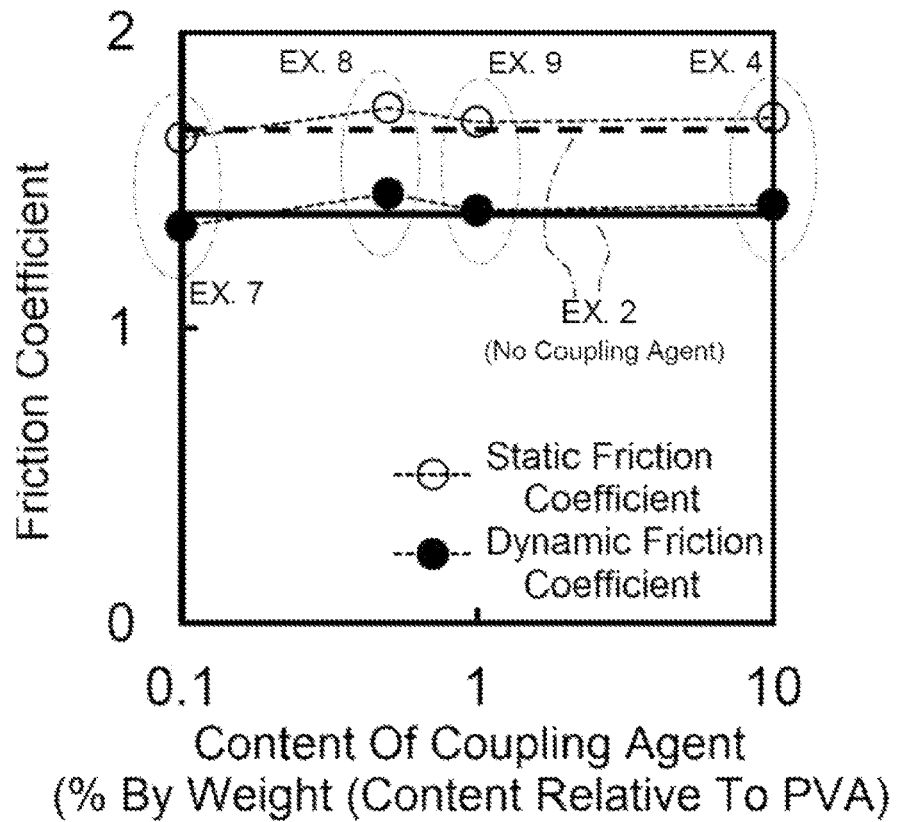
FIG. 12 is a graph representing static friction coefficients and dynamic friction coefficients of elastic bodies of Examples.
Figure 13:
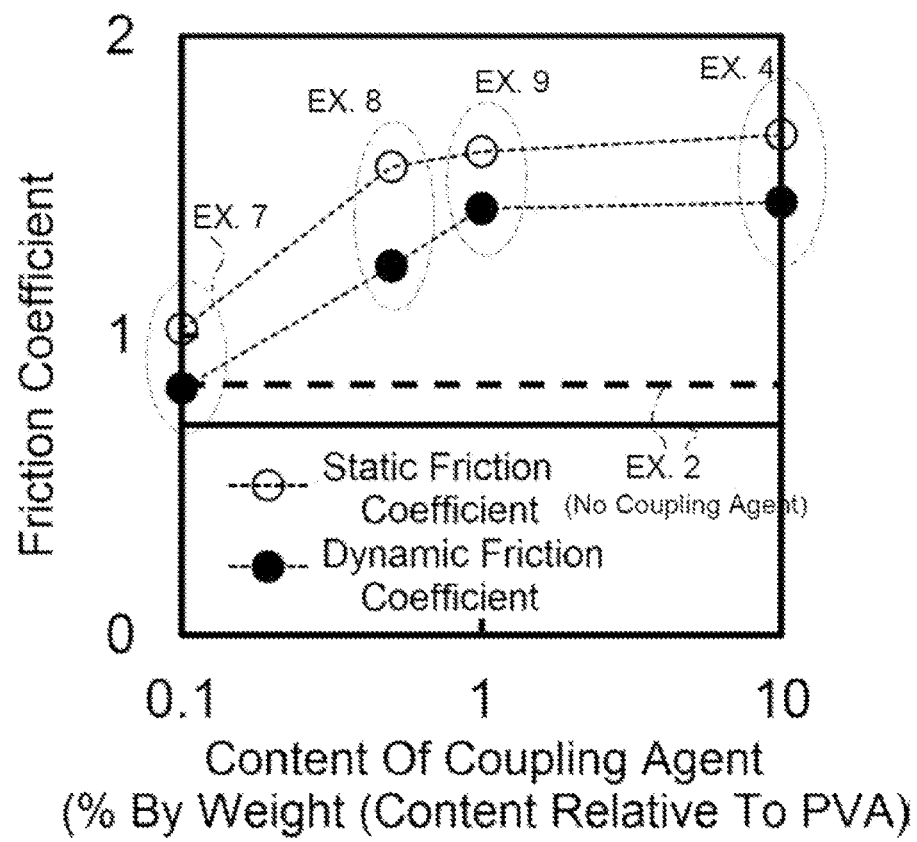
FIG. 13 is a graph representing static friction coefficients and dynamic friction coefficients of elastic bodies of Examples.

FIGS. 12 and 13 are graphs each representing the relationship between the blending amount of the additional silane coupling agent and the static and dynamic friction coefficients in the friction tests 1 and 2 for the elastic bodies of Examples 2, 4, and 7 to 9. As can be seen from FIG. 12, even if the blending amount of the additional coupling agent is changed, the effect of improving the static friction coefficient and the dynamic friction coefficient by the hydrogel is not substantially affected in these elastic bodies. On the other hand, according to FIG. 13, it is understood that, when the blending amount of the additional coupling agent is increased, the lowering of the static friction coefficient and the dynamic friction coefficient due to being left in water is effectively suppressed. In FIG. 13, the lowering of the static friction coefficient and the dynamic friction coefficient is sufficiently suppressed in the elastic body of Example 9 in which the blending amount of the additional silane coupling agent is 1%, and even if the silane coupling agent is blended in a larger amount than that, the influence on the static friction coefficient and the dynamic friction coefficient is hardly observed. Therefore, it can be seen that the lowering of the static friction coefficient and the dynamic friction coefficient is most efficiently suppressed in the elastic body of Example 9.

Effect by Blending an Amount of a Crosslinking Agent in Hydrogel

Figure 14:
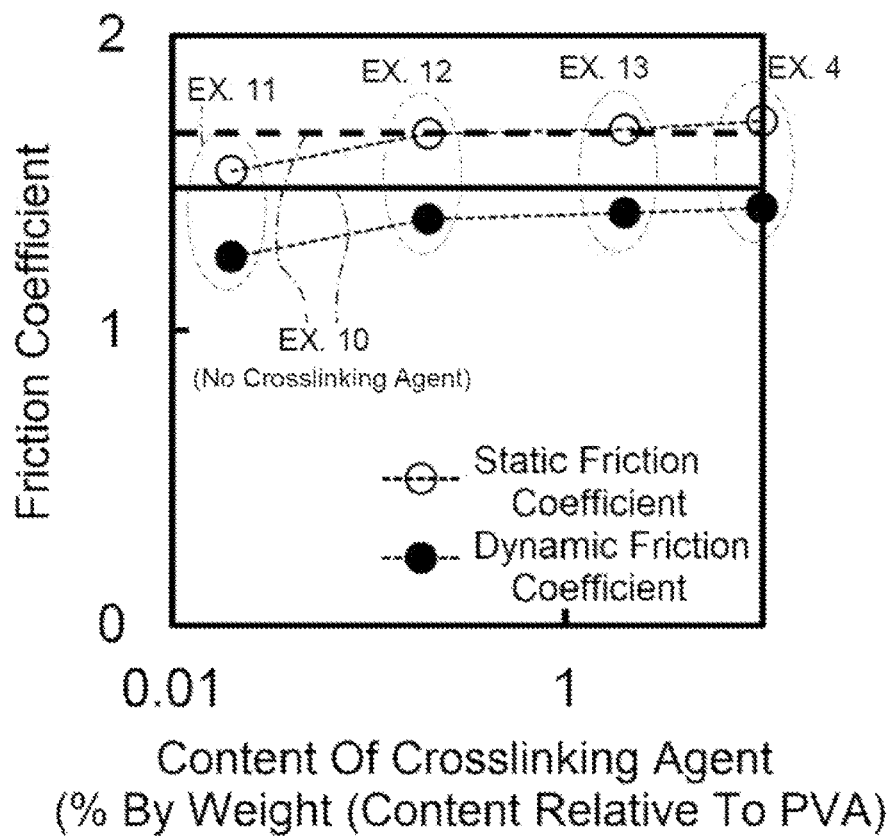
FIG. 14 is a graph representing static friction coefficients and dynamic friction coefficients of elastic bodies of Examples.
Figure 15:
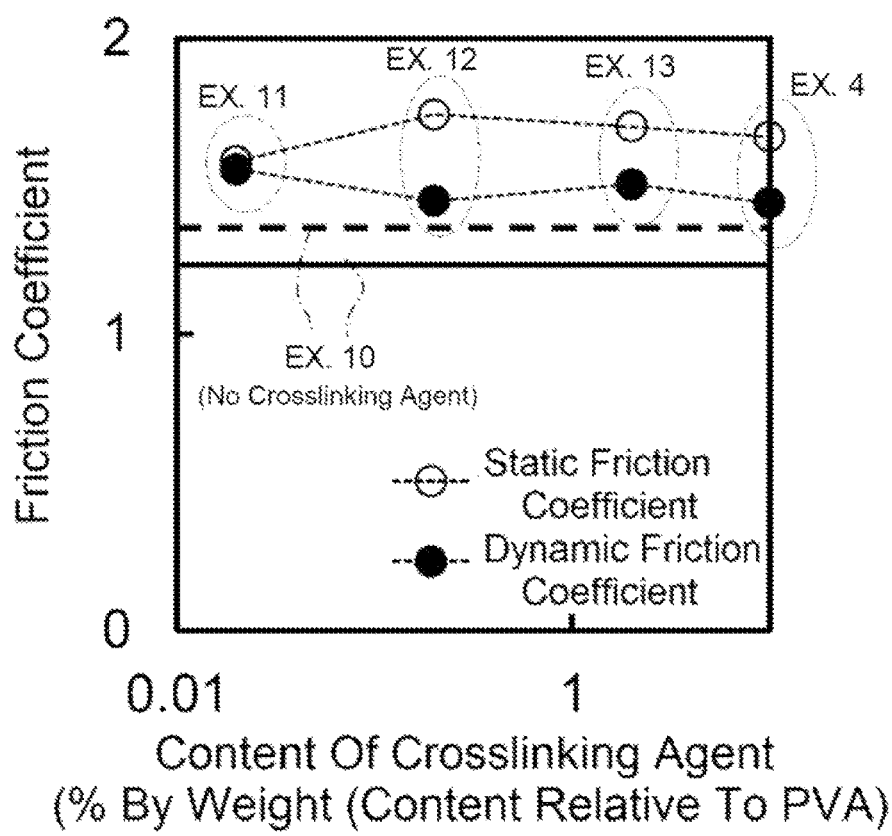
FIG. 15 is a graph representing static friction coefficients and dynamic friction coefficients of elastic bodies of Examples.

FIG. 14 and FIG. 15 are graphs each representing the relationship between the blending amount of the crosslinking agent included in the polyvinyl alcohol gel and the static and dynamic friction coefficients in the friction tests 1 and 2 for the elastic bodies of Examples 4 and 10 to 13. As can be seen from FIG. 14, in these elastic bodies, the effect of improving the static friction coefficient and the dynamic friction coefficient by the hydrogel is not greatly changed due to the crosslinking agent included in the hydrogel. On the other hand, according to FIG. 15, it can be seen that the lowering of the static friction coefficient and the dynamic friction coefficient after being left in water is effectively suppressed when using the hydrogel including the crosslinking agent, as compared with the hydrogel including no crosslinking agent. In FIG. 15, it is understood that the lowering of the static friction coefficient and the dynamic friction coefficient is sufficiently suppressed in the elastic body of Example 11 in which the blending amount of the crosslinking agent in the hydrogel is 0.02%, and that it is difficult to effectively increase the static friction coefficient and the dynamic friction coefficient even if the crosslinking agent is included in a larger amount than that. Therefore, it is understood that the static friction coefficient and the dynamic friction coefficient are most efficiently increased in the elastic body of Example 11.

Effect by Saponification Degree of Polyvinyl Alcohol Gel

Figure 16:
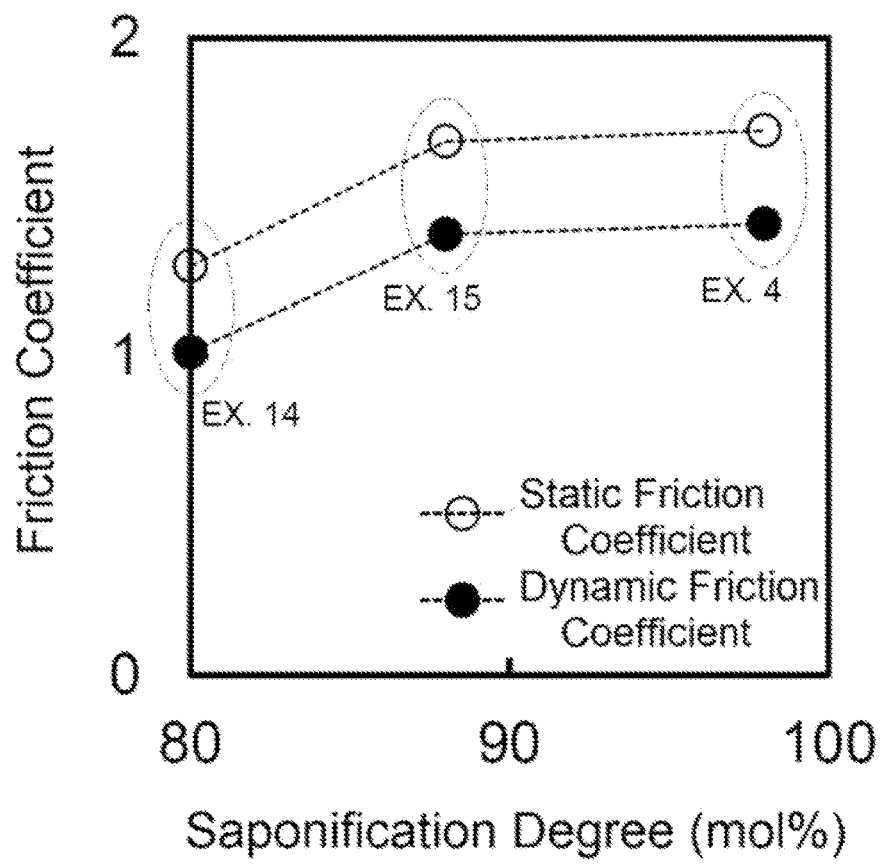
FIG. 16 is a graph representing static friction coefficients and dynamic friction coefficients of elastic bodies of Examples.
Figure 17:
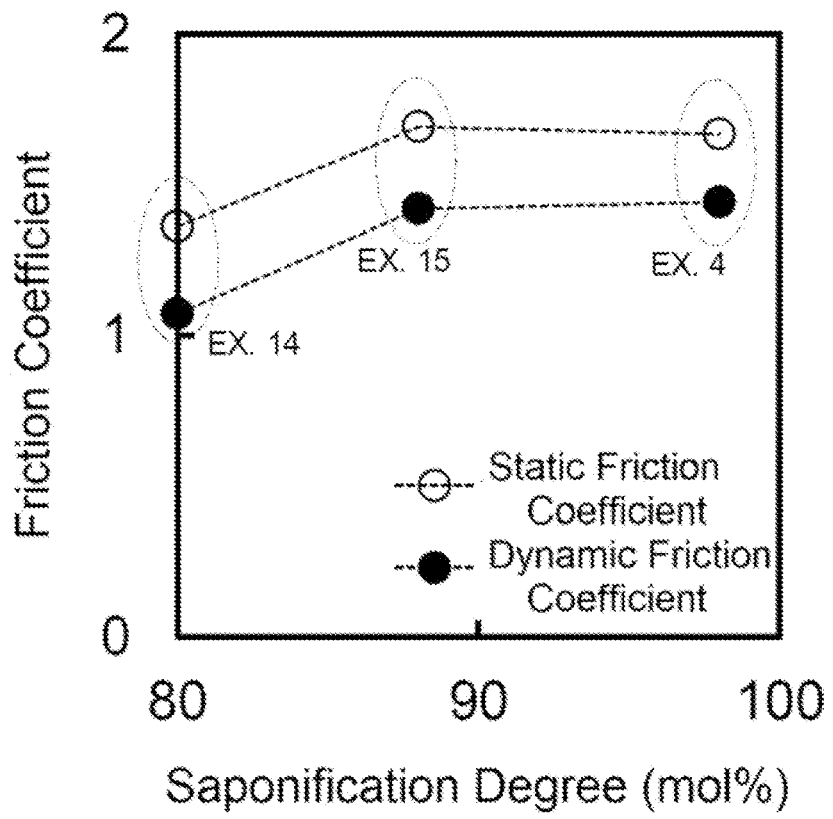
FIG. 17 is a graph representing static friction coefficients and dynamic friction coefficients of elastic bodies of Examples.

FIG. 16 and FIG. 17 are graphs each representing the relationship between the saponification degree of the polyvinyl alcohol gel and the static and dynamic friction coefficients in the friction tests 1 and 2 for the elastic bodies of Examples 4, 14 and 15. As can be seen from FIG. 16 and FIG. 17, it can be seen that the higher the saponification degree of the polyvinyl alcohol gel, the more effectively the static friction coefficient and the dynamic friction coefficient of these elastic bodies are increased. This is considered to be due to the fact that the higher the saponification degree of the polyvinyl alcohol gel dispersed on the surface of the vulcanized rubber, the higher the hydrophilicity of the polyvinyl alcohol gel, so that the localization effect of water generated by causing water interposed between the surface of the elastic body and the columnar body sliding on the surface to be drawn to the positions provided with the polyvinyl alcohol gel is more remarkable.

As described above, it can be seen that the elastic bodies of Examples 1 to 15 in each of which the hydrogel particles are dispersed on the surface of the vulcanized rubber have greatly enhanced friction coefficients in a state of being wet by water, that is, wet-grip performance, as compared with the elastic body of Comparative Example 1 in which the hydrogel is not included.

Elastic Body in which Hydrogel Particles are Dispersed on the Surface of Silicone Rubber As a material of the elastomer, a thermosetting silicone rubber was used.

Further, as a material of the hydrogel, any of the following polyvinyl alcohol gel material and silicone hydrogel material was used.

Polyvinyl alcohol gel material: Frozen and pulverized particles (average particle size: 10 to 100 μm) obtained by freezing a polyvinyl alcohol gel (a) shown in Table 1 above at −196° C. and pulverizing the same.

Silicone hydrogel material: Silicone hydrogel particles (average particle size: 1 mm) obtained by cutting Comfilcon A (manufactured by Cooper Vision Co., Ltd., silicone hydrogel lens), which is a commercially available contact lens.

Comparative Example 2

An uncured silicone rubber was poured onto a concave hemispherical watch glass having a diameter of 142 mm and a radius of curvature of 71 mm to fill the watch glass, and heated at 80° C. for 90 minutes to cure the silicone rubber on the watch glass. After the silicone rubber had completely cured, an elastic body having a convex shape corresponding to the concave shape of the watch glass, the elastic body made of a cured silicone gel, was taken out from the watch glass.

Example 16

An elastic body was obtained in the same manner as in Comparative Example 2, except that the frozen and pulverized particles of the polyvinyl alcohol gel were dispersed and arranged on the concave surface of the watch glass before pouring the uncured silicone rubber onto the watch glass. The obtained elastic body had polyvinyl alcohol gel particles, which had been dispersed on the watch glass, on the convex surface of the cured silicone rubber.

Example 17

An elastic body was obtained in the same manner as in Comparative Example 2, except that, instead of the uncured silicone rubber, a mixed liquid obtained by mixing an uncured silicone rubber and frozen and pulverized particles of the polyvinyl alcohol gel was poured onto the watch glass. The obtained elastic body had polyvinyl alcohol gel particles inside and on the surface of the cured silicone rubber.

Example 18

An elastic body was obtained in the same manner as in Comparative Example 2, except that, instead of the frozen and pulverized particles of the polyvinyl alcohol gel, silicone hydrogel particles were dispersed and arranged on the concave surface of the watch glass. The obtained elastic body had silicone hydrogel particles, which had been dispersed on the watch glass, on the convex surface of the cured silicone rubber.

Friction Test 3

The static friction coefficient and dynamic friction coefficient of each of the elastic bodies of Examples 16 to 18 and Comparative Example 2 were measured by sliding the elastic body on a water-wet glass plate. Specifically, at an ambient temperature of 24° C. and a relative humidity (RH) of 75%, the surface of a flat glass plate was wet by water, and the elastic body was arranged on the water-wet surface of the glass plate so that the convex surface of the elastic body and the glass plate were in contact with each other. Then, the elastic body was slid on the surface of the glass plate at a vertical load of 0.981 N and a sliding speed of 10.0 mm/s, and the static friction coefficient and the dynamic friction coefficient at that time were measured.

The static friction coefficient and dynamic friction coefficient of each of the elastic bodies of Examples 16 to 18 and Comparative Example 2 obtained by the above friction test are shown in Table 3 below.

TABLE 3

| | Hydrogel | | Friction coefficient (Friction test 3) | |
|---|---|---|---|---|
| | Type | Arranged location | Static friction coefficient | Dynamic friction coefficient |
| C. Ex. 2 | — | — | 0.40 | 0.13 |
| Ex. 16 | PVA | Surface only | 3.63 | 2.92 |
| Ex. 17 | PVA | Surface plus Inside | 3.13 | 2.95 |
| Ex. 18 | Silicone hydrogel | Surface only | 0.88 | 0.50 |

Evaluation of Friction Test

As can be seen from the results shown in Table 3, even in the elastic bodies of Examples 16 to 18 in each of which hydrogel particles are dispersed on the silicone rubber surface, the static friction coefficient and the dynamic friction coefficient in a state of being wet by water, that is, the wet-grip performance is greatly enhanced as compared with the elastic body of Comparative Example 2 formed of only the silicone rubber including no hydrogel. Further, according to Examples 16 to 18, it can be seen that, if the hydrogel particles are dispersed on the silicone rubber surface, the effect of improving the static friction coefficient and the dynamic friction coefficient by the hydrogel particles is exhibited regardless of whether the hydrogel particles are provided inside the silicone rubber or not. Further, it can be seen that, even when either the polyvinyl alcohol gel or the silicone hydrogel is used as the hydrogel, the static friction coefficient and the dynamic friction coefficient in a state of being wet by water are increased.

Shoe Sole Member Including Aforementioned Elastic Body

The aforementioned silicone rubber material and the frozen and pulverized particles of the aforementioned polyvinyl alcohol gel material (a) were used as the elastomer and the hydrogel, respectively.

Comparative Example 3

An elastic body was obtained in the same manner as in Comparative Example 2, except that, instead of the watch glass, a forming mold for a shoe sole corresponding to the shape of an outer sole for a shoe (foot length: 27 cm) having a flat bottom surface, which is the ground engaging surface, was used.

Example 19

An elastic body was obtained in the same manner as in Comparative Example 2, except that the frozen and pulverized particles of the polyvinyl alcohol gel were dispersed and arranged on the bottom surface inside the forming mold for the shoe sole before pouring the uncured silicone rubber into the forming mold for the shoe sole. The obtained elastic body had polyvinyl alcohol gel particles, which had been dispersed inside the forming mold for the shoe sole, on the surface on the bottom side of an outer sole.

Friction Test 4

The static friction coefficient and the dynamic friction coefficient of each of the elastic bodies of Example 19 and Comparative Example 4 were measured in accordance with JIS T8101. Specifically, after each of the elastic bodies of Example 19 and Comparative Example 4 was fixed to a shoe sole of a shoe having no outer sole, the surface of a flat iron plate was wet by water at an ambient temperature of 24° C. and a relative humidity (RH) of 75%, and the shoe provided with the elastic body was arranged on the surface of the iron plate wet by water so that the bottom surface of the elastic body and the iron plate were in contact with each other. Then, the elastic body was slid on the surface of the iron plate at a vertical load of 500 N and a sliding speed of 300 mm/s, and the static friction coefficient and the dynamic friction coefficient at that time were measured.

The static friction coefficient and the dynamic friction coefficient of each of the elastic bodies of Example 19 and Comparative Example 3 obtained by the friction test are shown in Table 4 below.

TABLE 4

| | Hydrogel | | Friction coefficient (Friction test 4) | |
| --- | --- | --- | --- | --- |
| | Type | Arranged location | Static friction coefficient | Dynamic friction coefficient |
| C. Ex. 3 | — | — | 0.24 | 0.20 |
| Ex. 19 | PVA | Surface only | 0.38 | 0.36 |

Evaluation of Friction Test

As can be seen from the results shown in Table 4, even when the elastic body of Example 19, in which the hydrogel particles are dispersed on the surface of the silicone rubber, is used as an outer sole by forming the elastic body into an outer sole shape, which is a shoe sole member for a shoe, the static friction coefficient and the dynamic friction coefficient in a state of being wet by water, that is, the wet-grip performance is greatly enhanced as compared with the elastic body in the shape of the outer sole of Comparative Example 3 which includes no hydrogel.

The invention claimed is:

1. A shoe comprising an anti-slip member, wherein the anti-slip member is disposed at a ground engaging position of a shoe sole of the shoe, wherein the anti-slip member comprising:
    an elastic body comprising: an elastomer, a hydrogel, and a silane coupling agent,
    at least part of the hydrogel being dispersed on a surface of the elastic body, and
    the hydrogel being dispersed on the surface of the elastic body in a form of particles each having a particle size of 0.01 to 1000 μm.

2. The shoe according to claim 1, wherein a ratio of an area occupied by the hydrogel on the surface of the elastic body is 1 to 25% of an entire area of the surface of the elastic body.

3. The shoe according to claim 1, wherein the hydrogel is a crosslinked body.

4. The shoe according to claim 3, wherein the hydrogel comprises a polyvinyl alcohol gel.

5. The shoe according to claim 4, wherein the polyvinyl alcohol gel has a saponification degree of 80 to 100%.

6. The shoe according to claim 1, wherein the hydrogel comprises a silicone hydrogel.

7. The shoe according to claim 1, wherein
    the hydrogel is also dispersed inside the elastic body, and
    the anti-slip member includes the hydrogel in an amount of 1 to 10% by weight based on the elastomer.

8. The shoe according to claim 1, wherein the anti-slip member is disposed in at least one position corresponding to a heel, metatarsophalangeal joints, and a toe.

9. The shoe according to claim 2, wherein the hydrogel is a crosslinked body.

10. The shoe according to claim 9, wherein the hydrogel comprises a polyvinyl alcohol gel.

11. The shoe according to claim 10, wherein the polyvinyl alcohol gel has a saponification degree of 80 to 100%.

12. The shoe according to claim 2, wherein the hydrogel comprises a silicone hydrogel.

13. The shoe according to claim 3, wherein the hydrogel comprises a silicone hydrogel.

\* \* \* \* \*